Nov. 13, 1962     J. CHUNG     3,063,300

ADJUSTABLE MULTIPLE GROOVE SHEAVE

Filed Dec. 12, 1960     3 Sheets-Sheet 1

INVENTOR.
JACKSON CHUNG
BY
ATTORNEY

Nov. 13, 1962   J. CHUNG   3,063,300
ADJUSTABLE MULTIPLE GROOVE SHEAVE
Filed Dec. 12, 1960   3 Sheets-Sheet 2

INVENTOR.
JACKSON CHUNG
BY *M. A. Hobbs*
ATTORNEY

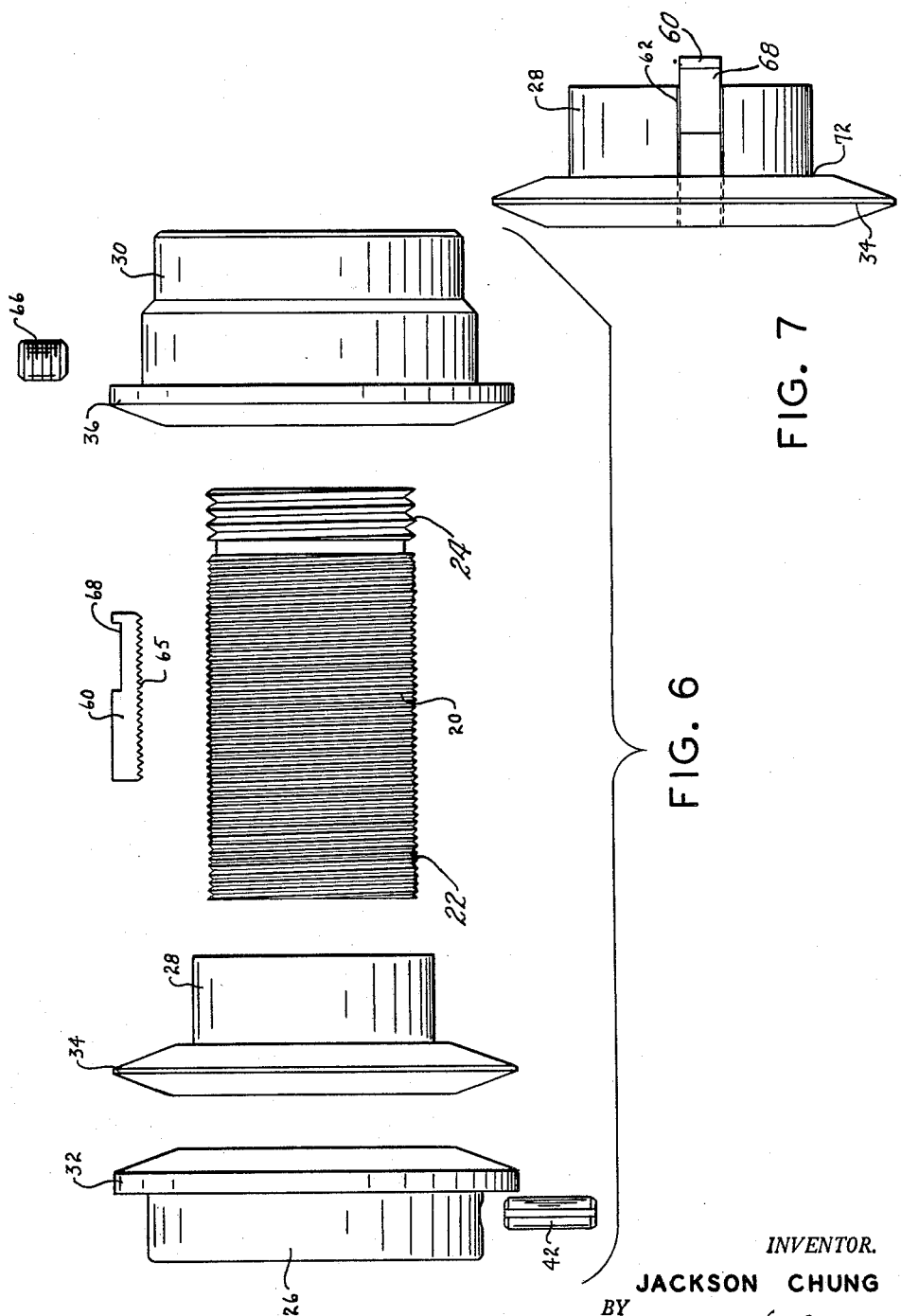

United States Patent Office 3,063,300
Patented Nov. 13, 1962

3,063,300
ADJUSTABLE MULTIPLE GROOVE SHEAVE
Jackson Chung, Mishawaka, Ind., assignor to Dodge Manufacturing Corporation, Mishawaka, Ind., a corporation of Indiana
Filed Dec. 12, 1960, Ser. No. 75,303
9 Claims. (Cl. 74—230.17)

The present invention relates to an adjustable sheave, and more particularly to variable pitch sheaves for multiple V-belt drives.

A number of different types of adjustable sheaves for multiple V-belt drives have been devised and extensively used in the past for varying the speed between a motor or other power driven shaft and a driven mechanism. However, these prior types of adjustable sheaves have had certain inherent disadvantages which have rendered them unsatisfactory or unsuitable for many different purposes, the disadvantages including limited range of adjustment, complicated adjustment mechanism requiring intricate machining and assembling operations with special tools or equipment, difficulty in obtaining and maintaining the desired adjustment, and inconvenience in reaching the adjustment mechanism and making an adjustment once the sheave has been mounted in operating position on a shaft in a variable speed drive device. A number of the various prior adjustment mechanisms for multiple belt sheaves have, due to mechanical limitations, and difficulty in making adjustments, necessarily been confined in their application to sheaves of two-belt drives. It is therefore one of the principal objects of the present invention to provide an infinitely variable multiple V-belt sheave which can be accurately adjusted and effectively maintained in its adjusted position with easily accessible, readily manipulated fixtures, and without the use of any special tools or gauges, and which can be manufactured on standard machine tools without intricate machining operations.

Another object of the present invention is to provide a versatile variable V-belt sheave which can readily be mounted on shafts using conventional securing fixtures without any changes or modifications being required, and which can be varied to any desired speed within the adjustment range by merely releasing a single set screw or similar securing means and rotating a concentrically mounted axially arranged part.

Still another object is to provide an adjustable groove structure for multiple groove sheaves for V-belts, which is easily adaptable to and readily adjustable in sheaves of various sizes and number of grooves.

A further object of the invention is to provide a compact, relatively simple adjustable sheave of the multiple V-belt type having no protruding adjustment screws, fixtures, lugs or bosses, and being so constructed that it can readily be assembled, mounted in operating position on either a drive or driven shaft or other rotating member, and easily maintained in satisfactory operating condition over long periods of time without servicing.

Additional objects and advantages of the present invention will become apparent from the following description and accompanying drawings, wherein:

FIGURE 6 is an exploded elevational view of the present variable sheave, showing the individual parts thereof and illustrating the manner in which the parts are assembled into the final sheave; and FIGURE 7 is an elevational view of a portion of the sheave showing the manner in which certain parts thereof are assembled.

Figure 1:
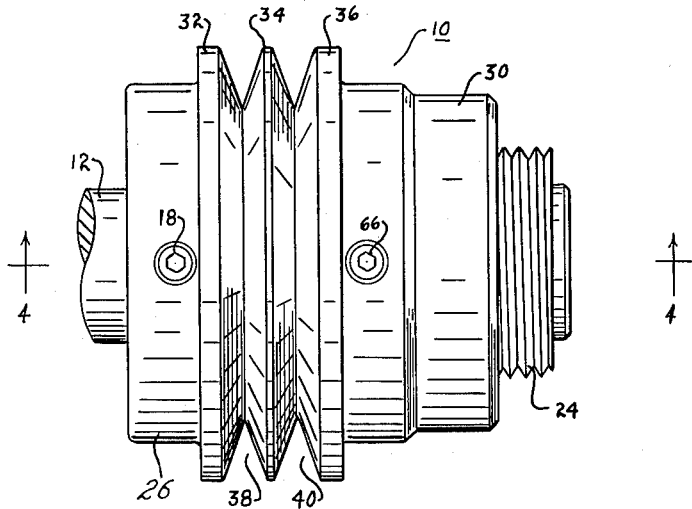
FIGURE 1 is a side elevational view of a multiple V-belt type sheave embodying the present invention, showing the sheave mounted on a shaft such as the shaft of an electric motor.
Figure 2:
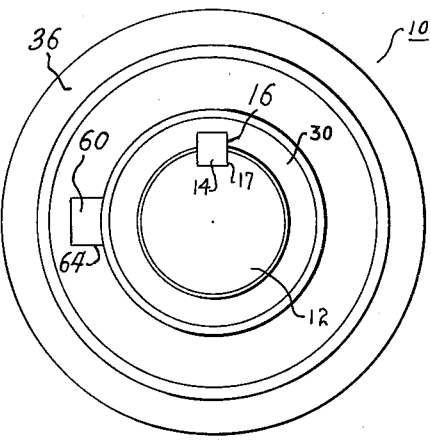
FIGURE 2 is an elevational view of the right hand end of the sheave shown in FIGURE 1.
Figure 3:
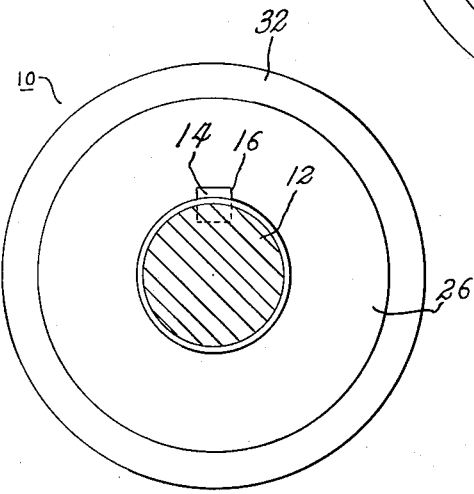
FIGURE 3 is an elevational view of the left hand end of the sheave shown in FIGURE 1.

Referring more specifically to the drawings, the present variable pitch sheave, designated by the numeral 10, is shown mounted on a shaft 12 of an electrical motor or other power drive shaft and secured in driving relation thereto by a key 14 and key ways 16 and 17 in the sheave and shaft, respectively, and set screw 18. The present sheave is designed to be used in conjunction with the drive and driven shafts of a motor and machine, or as a part of a more sophisticated variable speed drive mechanism in which a plurality of sheaves of the present design may be used. The present sheave is not limited to any particular variable speed system or mechanism but has wide application in the power transmission field wherever variable speed V-belt drives are required or desired. The V-belt used with the present sheave is the conventional or standard V-belt constructed of fabric and rubber of trapezoidal cross section, and hence will not be described or shown in detail herein.

Figure 4:
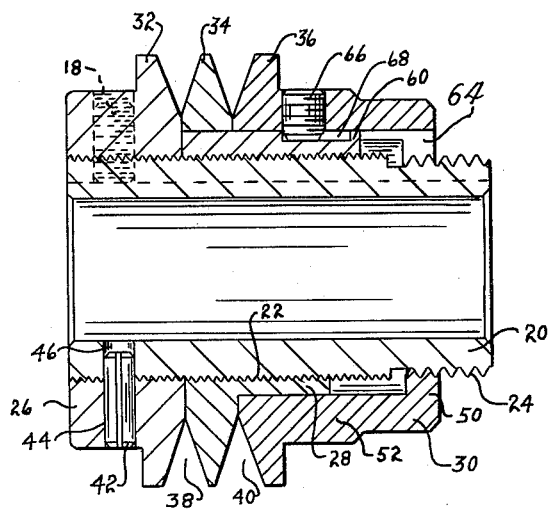
FIGURE 4 is a longitudinal cross sectional view of the sheave shown in the preceding figures, taken on line 4—4 of FIGURE 1, showing the sheave in its fully contracted position for driving the belts thereon at maximum speed.
Figure 5:
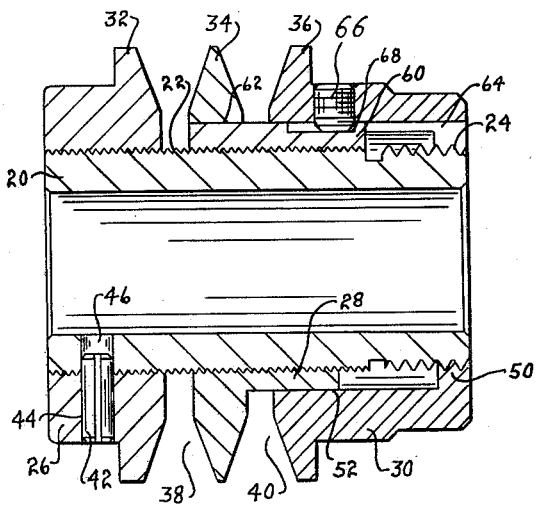
FIGURE 5 is a longitudinal cross section view of the sheave shown in the preceding figures, taken on the same line as the section in FIGURE 4, showing the sheave in its fully expanded position for driving the belts at minimum speed.

The assembled structure forming the present sheave is clearly shown in FIGURE 4 in its fully contracted position and in FIGURE 5 in its fully expanded position, and the individual parts comprising the sheave separated from one another but in their general relative position to one another are shown in the exploded view thereof in FIGURE 6. The sheave consists of a cylindrical shaped hub 20 extending the full length thereof and having two separate threaded portions 22 and 24 of different pitch on the external surface, portion 22 receiving internally threaded sleeves 26 and 28 and portion 24 receiving an internally threaded sleeve 30. While the pitch of the threads on each portion may be varied to satisfy a particular requirement or installation, the threads of the portions must be both right hand or left hand and the threads of portion 24 must have a pitch double that of portion 22 for reasons readily apparent from the following description, although the two portions may be either single or multiple lead threads. Secured to and preferably formed integrally with the sleeves 26, 28 and 30 are annular frusto-conically shaped flanges 32, 34 and 36 defining V-belt grooves 38 and 40, flanges 32 and 36 being secured to the inner ends of sleeves 26 and 30 and flange 34 to the end of sleeve 28 adjacent sleeve 26. The angle of the grooved sides may be that required for any standard V-belt and the sides are smoothly polished to prevent excessive wear of the belt.

Sleeve 26 is threaded onto the hub with the outer end on a plane with the adjacent end of the hub and is firmly secured in place by a pin 42 seated in aligned holes 44 and 46 in the sleeve and hub. In the actual assembly operation this sleeve is mounted in place after sleeve 28. Sleeve 28 is threaded onto hub 20 from the left hand end, as viewed in FIGURES 4 and 5, and is adapted to move by rotation on the hub from its completely contracted position with flange 34 against flange 32 to its fully extended position, thereby contracting and expanding groove 38 and effectively varying the pitch diameter of the sheave with respect of groove 38. Sleeve 30 consists of a reduced diameter internally threaded portion 50 and an enlarged portion 52, the inner wall of which is unthreaded and of substantially larger diameter than the threaded portions of the hub so that it will slip freely onto the hub over the threads and onto the smooth external surface of sleeve 28. The threads of portion 50 engage threaded portion 24 of the hub, and rotation of sleeve 30 moves flange 36 from its completely contracted position against flange 34 to its fully extended position, thereby contracting and expanding groove 40 and effectively varying the pitch diameter of the sheave with respect to this groove.

In order to expand grooves 38 and 40 simultaneously and to lock flanges 34 and 36 in any desired adjusted position, a key 60 inserted in key seats 62 and 64 of sleeves 28 and 30, respectively, and having thread segments 65 corresponding to the threads on threaded portion 22 of the hub, prevents relative rotation of sleeves 28 and 30 while permitting axial movement relative to one another and to the hub. After an adjustment has been completed by rotating sleeves 28 and 30 on the hub to vary the size of grooves 38 and 40, the two sleeves are locked in place by a set screw 66 extending through a threaded hole in sleeve 30 and engaging the external surface of key 60, thereby clamping the key firmly against the external surface of the hub. Key 60 may contain a slot 68 for receiving the inner end of set screw 66 and forming maximum limit of travel of the key and consequently of sleeves 28 and 30.

One of the particular advantages of the present variable pitch sheave is the ease with which it can be machined from standard metal stock on conventional machine tool equipment, as can clearly be seen from the exploded view of the parts in FIGURE 6. After the individual parts have been machined, they are assembled, first threading sleeve 28 onto hub 20 from the left hand end thereof, as viewed in FIGURES 4, 5 and 6, until the inner edge of flange 34, identified by numeral 72, is approximately on a plane with the left hand end of the hub. With sleeve 28 in this position, flange 34 is positioned beyond the end of the hub with the bottom and left hand end of key seat 62 fully exposed beyond the end of the hub, thus providing sufficient space in which to insert key 60 in the seat, which extends the full length and thickness of the sleeve. In assembling the key in the seat, the key is inserted in the seat at a substantial angle from the axis of the hub until its proper radial position is obtained and is then moved to its position longitudinal with the surface of the hub as seen in FIGURES 4, 5 and 7. With the key in this position, sleeve 28 is threaded the full length of the threaded portion 22 and sleeve 26 is threaded onto the hub and secured in place by pin 42 with its left hand end on a plane with the corresponding end of the hub. Sleeve 30 is then placed over the right hand end of the hub and sleeve 28, as seen in FIGURES 4 and 5, with key 60 extending into key seat 64, and is rotated to thread internally threaded portion 50 onto externally threaded portion 24 of the hub.

Since key 60 prevents relative rotation of sleeves 28 and 30 and permits only axial movement of the two sleeves relative to one another, continued rotation of sleeve 30 also rotates sleeve 28 advancing flange 34 toward flange 32 and flange 36 toward flange 34. Since the pitch of threads 24 is twice as great as the pitch of threads 22, the contraction and expansion of grooves 38 and 40 is the same during the rotation of sleeves 28 and 30. After the desired pitch diameter is obtained by rotation of the two sleeves 28 and 30 to the right or left on the hub, the adjusted position is maintained by tightening set screw 66 inwardly against key 60 and firmly seating the key on the external threaded portion 22 of the hub. Whenever it is desired to adjust the sheave to vary the speed ratio between the drive and driven shaft, it is merely necessary to loosen set screw 66, rotate sleeves 28 and 30 to the right or left along the hub to obtain the exact desired pitch diameter and then tighten the set screw to lock the sleeves in the newly adjusted position.

While the basic concept of the present adjustable sheave for multiple V-belts is embodied in the two-belt unit shown in the drawings, it is apparent that additional belt grooves can be included in the sheave by duplicating in general the structural relationship between sleeves 28 and 30 and the respective threaded portions 22 and 24 of the hub. Various other changes and modifications may be made in the sheave without departing from the scope of the present invention.

I claim:
1. An adjustable sheave for a multiple V-belt drive, comprising a cylindrical hub, a threaded portion on the external surface of said hub, a second threaded portion on the external surface of said hub having threads of a pitch double the pitch of the threads of the first mentioned threaded portion, an annular flange secured to said hub adjacent the end having said first mentioned threaded portion, a flange threadedly received on said first threaded portion inwardly from said first mentioned flange, a flange threadedly received on said second mentioned threaded portion, means engaging said first mentioned threaded portion and interconnecting said second and third mentioned flanges for preventing relative rotation while permitting relative axial movement therebetween, and a means engaging said last mentioned means for locking said second and third flanges in adjusted position.

2. An adjustable sheave for a multiple V-belt drive, comprising a cylindrical hub, a threaded portion on the external surface of said hub, a second threaded portion on the external surface of said hub having threads of a pitch double the pitch of the threads of the first mentioned threaded portion, an annular flange on said hub adjacent the end having said first mentioned threaded portion, a sleeve threaded onto the first mentioned threaded portion inwardly from said flange, an annular flange on the end of said sleeve adjacent said first mentioned flange, a second sleeve having an internally threaded section near its outer end for engaging said second mentioned threaded portion on said hub, an annular flange on the inner end of said second sleeve, and a means disposed in said sleeves engaging said first mentioned threaded portion for preventing relative rotation between said sleeves while permitting relative axial movement therebetween and for locking said sleeves in adjusted position.

3. An adjustable sheave for a multiple V-belt drive, comprising a cylindrical hub, a threaded portion on the external surface of said hub, a second threaded portion on the external surface of said hub having threads of a pitch double the pitch of the threads of the first mentioned threaded portion, an annular flange on said hub adjacent the end having said first mentioned threaded portion, a sleeve threaded onto the first mentioned threaded portion inwardly from said flange, an annular flange on the end of said sleeve adjacent said first mentioned flange, a second sleeve overlapping said first sleeve and having an internally threaded section near its outer end for engaging said second mentioned threaded portion on said hub, an annular flange on the inner end of said second sleeve, a means engaging said first mentioned threaded portion for preventing relative rotation between said sleeves while permitting relative axial movement therebetween, and a means extending inwardly through said second sleeve and seating said last mentioned means on said hub for locking said sleeves in adjusted position.

4. An adjustable sheave for a multiple V-belt drive, comprising a cylindrical hub, a threaded portion extending inwardly from one end of said hub, a second threaded portion extending inwardly from the other end of said hub and having threads of a pitch double the pitch of the threads on the first mentioned threaded portion, an annular flange on said hub adjacent the end having said first mentioned threaded portion, a sleeve threaded onto the first mentioned threaded portion inwardly from said flange and having a key seat therein, an annular flange on the end of said sleeve adjacent said first flange movable toward and away from said first mentioned flange, a key an said seat engaging said first mentioned threaded portion, a second sleeve overlapping said first sleeve and key and having an internally threaded section near its outer end for engaging said second mentioned threaded portion on said hub, an annular flange on the inner end of said second sleeve movable toward and away from said second mentioned flange, and a set screw extending inwardly through said second sleeve and seating said key on said hub for locking said first and second sleeves in adjusted position.

5. An adjustable sheave for a multiple V-belt drive, comprising a cylindrical hub, a threaded portion on the external surface extending inwardly from the one end of said hub, a second threaded portion extending inwardly from the other end of said hub and having threads of a pitch double the pitch of the threads on the first mentioned threaded portion, a first sleeve secured to the end of said hub about said first mentioned threaded portion, an annular flange on the inner end of said sleeve, a second sleeve threaded onto the first mentioned threaded portion inwardly from said first sleeve and having a key seat extending therethrough the full length thereof, an annular flange on the end of said second sleeve adjacent said first sleeve movable toward and away from said first mentioned flange, a key in said key seat having thread segments on its inner surface for engaging the first mentioned threaded portion of said hub, a third sleeve overlapping said second sleeve and key and having an internally threaded section near its outer end for engaging said second mentioned threaded portion on said hub, an annular flange on the inner end of said third sleeve movable toward and away from said second mentioned flange, and a means extending inwardly through said third sleeve and engaging said bar for locking said second and third sleeves in adjusted position.

6. An adjustable sheave for a multiple V-belt drive, comprising a cylindrical hub, a threaded portion on the external surface extending inwardly from one end of said hub, a second threaded portion extending inwardly from the other end of said hub and having threads of a pitch double the pitch of the threads on the first mentioned threaded portion, a first sleeve threaded onto the end of said first mentioned threaded portion, an annular flange on the inner end of said sleeve, a second sleeve threaded onto the first mentioned threaded portion inwardly from said first sleeve and having a key seat extending therethrough the full length thereof, an annular flange on the end of said second sleeve adjacent said first sleeve movable toward and away from said first mentioned flange, a key in said key seat engaging said first mentioned threaded portion, a third sleeve overlapping said second sleeve and key and having an internally threaded section near its outer end for engaging said second mentioned threaded portion on said hub, an annular flange on the inner end of said third sleeve movable toward and away from said second mentioned flange, and a set screw extending inwardly through said third sleeve and seating said key on said hub for locking said second and third sleeves in adjusted position.

7. An adjustable sheave for a multiple V-belt drive, comprising a cylindrical hub having a cylindrical bore extending longitudinally therethrough, a threaded portion on the external surface extending inwardly from one end and a second threaded portion extending inwardly from the other end of said hub and having threads of a pitch double the pitch of the threads on the first mentioned threaded portion, a first sleeve threaded onto the end of said first mentioned threaded portion, an annular flange on the inner end of said sleeve, a second sleeve threaded onto the first mentioned threaded portion inwardly from said first sleeve and having a key seat extending therethrough the full length thereof, an annular flange on the end of said second sleeve adjacent said first sleeve movable toward and away from said first mentioned flange, a key in said key seat having thread segments on its inner surface for engaging the first mentioned threaded portion of said hub, a third sleeve overlapping said second sleeve and key and having an internally threaded section near its outer end for engaging said second mentioned threaded portion on said hub, an annular flange on the inner end of said third sleeve movable toward and away from said second mentioned flange, and a means extending inwardly through said third sleeve and engaging said bar for locking said second and third sleeves in adjusted position.

8. An adjustable sheave for a multiple V-belt drive, comprising a cylindrical hub having a cylindrical bore extending longitudinally therethrough, a threaded portion on the external surface extending inwardly from one end and a second threaded portion extending inwardly from the other end of said hub and having threads of a pitch double the pitch of the threads on the first mentioned threaded portion, a first sleeve threaded onto the end of said first mentioned threaded portion, means for holding said sleeve in fixed position on said hub, an annular flange on the inner end of said sleeve, a second sleeve threaded onto the first mentioned threaded portion inwardly from said first sleeve and having a longitudinal key seat extending therethrough the full length thereof, an annular flange on the end of said second sleeve adjacent said first sleeve movable toward and away from said first mentioned flange, a key in said seat having thread segments on its inner surface for engaging the first mentioned threaded portion of said hub and a recess in its external surface, a third sleeve overlapping said second sleeve and key and having an internally threaded section near its outer end for engaging said second mentioned threaded portion on said hub, an annular flange on the inner end of said third sleeve movable toward and away from said second mentioned flange, and a set screw extending inwardly through said third sleeve and engaging said key in said recess for locking said second and third sleeves in adjusted position.

9. An adjustable sheave for a multiple V-belt drive, comprising a cylindrical hub having a cylindrical bore extending longitudinally therethrough, a threaded portion on the external surface extending inwardly from one end over half the length of the hub and a second threaded portion having threads of a pitch double the pitch of the threads on the first mentioned threaded portion and extending inwardly from the other end of said hub but spaced from said first mentioned threaded portion, a first sleeve threaded onto the end of said first mentioned threaded portion, means for holding said sleeve in fixed position on said hub, an annular frusto-conical flange on the inner end of said sleeve, a second sleeve threaded onto the first mentioned threaded portion inwardly from said first sleeve and having a longitudinal key seat extending therethrough the full length thereof, an annular frusto-conical flange on the end of said second sleeve adjacent said first sleeve movable toward and away from said first mentioned flange, a key in said seat having thread segments on its inner surface for engaging the first mentioned threaded portion of said hub and a recess in its external surface, a third sleeve overlapping said second sleeve and key and having an inwardly extending member on its outer end with threads for engaging said second mentioned threaded portion on said hub, an annular frusto-conical flange on the inner end of said third sleeve movable toward and away from said second mentioned flange, and a set screw extending inwardly through said third sleeve and engaging said key in said recess for locking said second and third sleeves in adjusted position.

References Cited in the file of this patent

UNITED STATES PATENTS

| | | |
|---|---|---|
| 1,020,026 | Clark | Mar. 12, 1912 |
| 2,140,182 | Bowen | Dec. 13, 1938 |
| 2,280,270 | Stoner | Apr. 21, 1942 |
| 2,475,955 | Gerbing | July 12, 1949 |
| 2,633,031 | Browning | Mar. 31, 1953 |

FOREIGN PATENTS

| | | |
|---|---|---|
| 681,123 | Great Britain | Oct. 15, 1952 |